US004001691B2

United States Statutory Invention Registration [19]

[11] Reg. Number: H1691

[45] Published: Nov. 4, 1997

Ono et al.

[54] APPARATUS FOR APPLYING A PESTICIDE SPRAY

[76] Inventors: Tateo Ono, c/o Shizuoka-ken Agricultural Experiment Station, 678-1, Toyotacho Tomioka, Iwata-gun, Shizuoka-ken; Susumu Miyashita, c/o Kioritz Corporation, 7-2 Suehirocho 1-chome, Ohme, Tokyo 198, both of Japan

[21] Appl. No.: 609,863

[22] Filed: Mar. 4, 1996

Related U.S. Application Data

[63] Continuation of Ser. No. 376,059, Jan. 20, 1995, abandoned, which is a continuation of Ser. No. 120,682, Sep. 13, 1993, abandoned.

[30] Foreign Application Priority Data

Sep. 14, 1992 [JP] Japan ..... 4-271178

[51] Int. Cl.[6] ..... B05B 5/03

[52] U.S. Cl. ..... 239/3; 239/310; 239/337; 239/706; 239/709; 239/143; 222/195; 366/101

[58] Field of Search ..... 239/3, 709, 706, 239/310, 337, 364, 366, 360, 143; 222/195; 366/101

[56] References Cited

U.S. PATENT DOCUMENTS

| | | | |
|---|---|---|---|
| 835,408 | 11/1906 | Devore | 239/143 X |
| 2,784,350 | 3/1957 | Sedlacsik | 239/704 |
| 3,550,854 | 12/1970 | Fischer | 239/143 X |
| 4,437,614 | 3/1984 | Garcowski | 239/704 X |
| 4,621,268 | 11/1986 | Keeling et al. | 239/3 X |
| 4,664,315 | 5/1987 | Parmentar et al. | 239/706 |
| 4,673,132 | 6/1987 | Inculet et al. | 239/700 |
| 4,762,274 | 8/1988 | Barls et al. | 239/704 X |

FOREIGN PATENT DOCUMENTS

| | | | |
|---|---|---|---|
| 749440 | 5/1978 | U.S.S.R. | 239/143 |
| 2192351 | 1/1988 | United Kingdom . | |
| 2222966 | 3/1990 | United Kingdom | 239/708 |

*Primary Examiner*—Michael J. Carone

[57] ABSTRACT

Particles of spray solution are given with an electrostatic charge by applying voltage of 300 to 800 V thereon as the solution passes through the tip of the spray nozzle of an electrostatic spray dispenser. The tip of the spray nozzle is separate and adjustable with respect to the nozzle and has on its inner surface the electrode

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR APPLYING A PESTICIDE SPRAY

RELATED APPLICATION

This is a Continuation of Ser. No. 08/376,059, filed Jan. 20, 1995 now abandoned, which is a continuation of Ser. No. 08/120,682 filed Sep. 13, 1993 now abandoned.

BACKGROUND OF THE INVENTION

This invention relates to a method of pesticide application, particularly to the application of pesticides which are effective to control pests in a greenhouse.

To avoid any adverse effect on worker's health, during application of pesticides such as insecticides, acaricides and fungicides in greenhouses, it is preferable to perform the pest control operation from the outside of the greenhouse. In this case, however, the uniform application of the pesticide is a problem (see Japanese Patent Application Laid Open Nos. 48159/1985 and 224928/1986, for example).

To solve the aforementioned problem, various electrostatic spray method have been proposed (see Japanese Patent Application Laid Open Nos. 41632/1986, 227864/1986, and 34661/1989, for example). These electrostatic spray methods provide an electrostatic charge to the particles of the spray solution so that sufficient number of spray particles are caused to deposit even on the back surface of leaves of growing vegetables and the like.

Further, it has been found that, in any case, the efficacy of the pesticide is greatly improved if a highly concentrated spray solution in very low volume is applied in the form of particulates and the particulates fill the interior of the greenhouse.

Presently, pesticides registered in Japan for use in the application of the method described in this invention are all fungicides except for only one insecticide. This reflects in part the belief that the insecticide can achieve a desired efficacy against insects and pests even when it is not deposited on the back surface of leaves of growing plants. In case of fungicide, on the other hand, sufficient control of diseases, infecting the back surface of leaves, cannot be anticipated unless the fungicide is deposited on the back surface leaves.

Therefore, the aforementioned electrostatic application method is used. The electrostatic application method provides an electrostatic charge to the particles of spray solution as aforementioned so that the particles will be attracted and then deposited onto the growing plants including depositing of the particles on the back surface of leaves.

Although the ordinary electrostatic application method, however, gives an electrostatic charge to the particles of the spray solution by applying high voltage from 2 KV to 10 KV or greater, it does not provide a sufficient deposition efficiency onto the growing plants but has, in fact, a high risk of electric shock.

As a result of our investigation, it was found that according to the ordinary methods using high voltage in applying the electrostatic charge to the particles of the spray solution, the actual voltage applied to the particles was too high and, therefore, most of spray particles deposited on the both surfaces of leaves of plants were located with a limited (i.e. small) area from the spray equipment, with limited dispersion of the particles. Although the ordinary system may be modified to provide a desired efficacy by moving the spray nozzle or the spray equipment itself within the greenhouse, installation of an automatic travel system of the spray nozzle or the spray equipment, however, needs significant investment.

SUMMARY OF THE INVENTION

The object of the present invention is to provide a method which is superior and more economical in the deposition efficient of a pesticide spray solution onto growing plants.

In order to implement the above object, the present invention provides an improved method for electrostatically charging particles of the spray solution by applying voltage of 300 to 800 V thereto and then to spray them.

The present invention provides a spray equipment which generates particles of spray solution in a range of 10 to 20 microns. One or more spray units are placed inside the greenhouse according to the size of the greenhouse.

The electrostatic charge is given to the particles exiting from the spray nozzle of the equipment by applying a voltage of 300 to 800 V and then the particles are sprayed inside the greenhouse. The sprayed particles float in air and are dispersed in the atmosphere of greenhouse by natural air conversion occurred after sunset or by forced air conversion. Then they will fall and deposit uniformly and efficiently on the entire surface, including the back surface of the leaves of growing plants.

The value of the voltage applied to the particles of the spray solution to provide the electrostatic charge was obtained from the results of various experiments repeatedly carried out by placing the droplet detection paper on growing plants. This indicates that the deposition of particles on the back surface of leaves is unsatisfactory when the voltage applied is less than 300 V. On the other hand, uniform spray and floating effect cannot be obtained when the voltage applied is great than 800 V.

DETAILED DESCRIPTION OF THE INVENTION

The following is a detailed description of an embodiment of spray equipment implementing the present invention and referring drawings.

Figure 1:
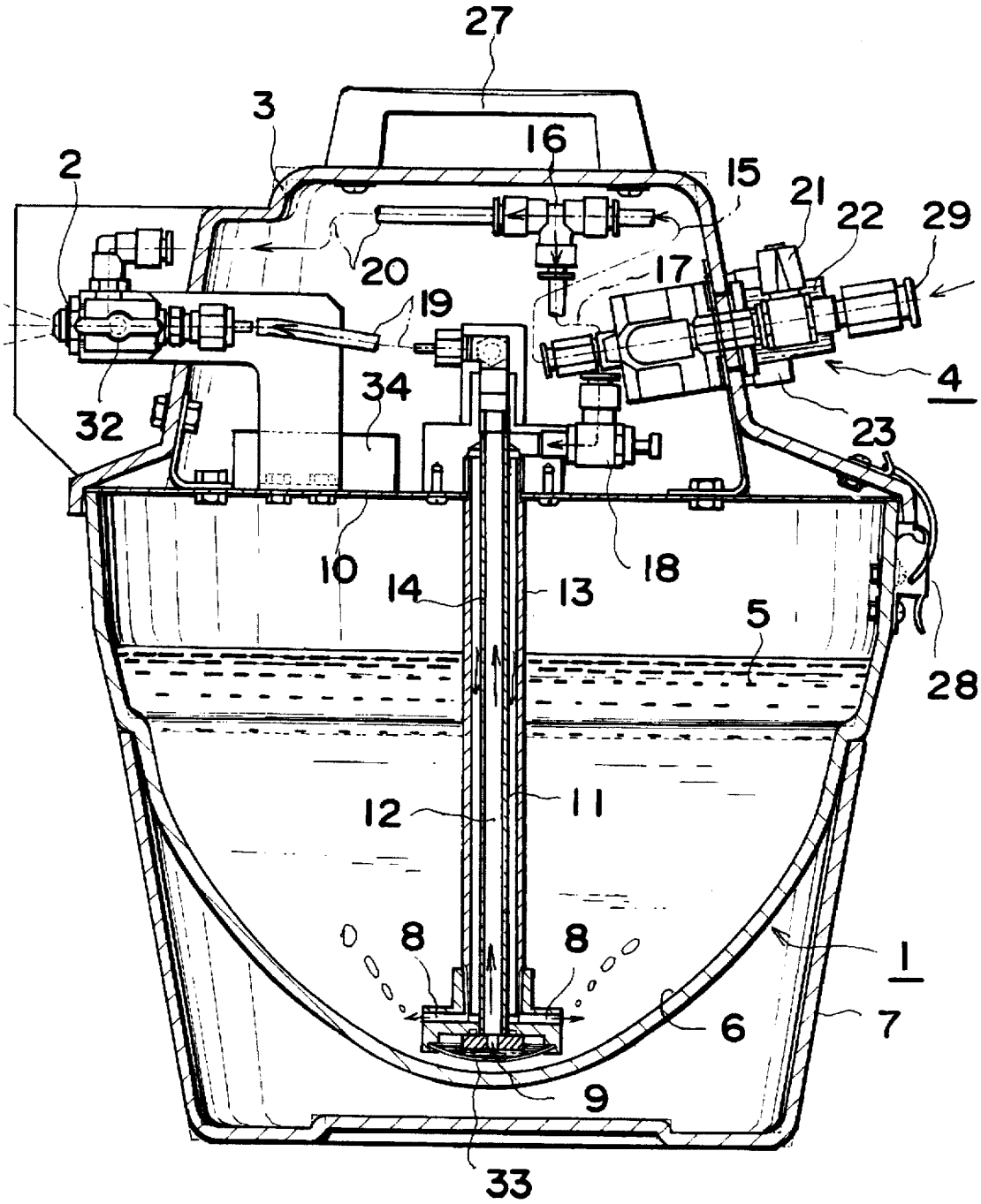
FIG. 1 is a vertical sectional view showing an embodiment of spray equipment used for the implementation of the present invention.

FIG. 1 shows a small size spray unit, which is easy to carry but actually used at fixed position which is different type spray equipment from the ordinary one. In FIG. 1, the numeral 1 is around bottom solution tank designed to maximize the mixing effect by conversion, 2 is an air assisted liquid spray nozzle arranged so as to extend outside of a tank cover 3 closing the upper part of the solution tank 1. A compressed air supply 4 is mounted on the same tank cover 3 opposite the spray nozzle 2. These parts are arranged as to supply compressed air at the predetermined pressure and flow rate into the solution tank 1 to eject the spray through the nozzle 2 via the compressed air supply 4 so that pesticide solution 5 in the solution tank 1 is sucked by the air flow inside the solution tank 1 and sprayed from the spray nozzle 2 in a form of mist of the particles into the atmosphere of the greenhouse together with compressed air.

The following is a more detailed description of the equipment. The lower bottom part 6 of the solution tank 1 is constructed in a round shape in order to provide better mixing effect and to minimize any residual solution in the tank. A stationary supporting housing 7 is provided outside and surrounding the round lower bottom part 6. Mounted near the lowest position of the round lower bottom part 6 is a manifold provided with radical air outlets 8 pointed in the radial direction, through which a part of compressed air is discharged for mixing and compressing the pesticide solution 5 in the tank 1. The manifold is further provided at its tip with an inlet 9 for introduction of the pesticide solution 5 from the tank 1. A strainer 33 covers the inlet 9.

An inner cover 10 is provided on the top of the solution tank 1 so as to hermetically seal the tank. Mounted to the cover 10 and extending downwardly into connection with the manifold is a compressed air supply conduit 11 by which compressed air for mixing and compressing the pesticide solution 5 is fed to the outlets 8 and a pesticide solution supply conduit 12 communicating with inlet 9. The conduits 11 and 12 are provided as a double tubing structure in which the pesticide solution supply conduit 12 comprises a tube 14 concentrically mounted within an outer tube 13 so that the space defined between the two tubes forms the conduit 11.

Further, the top of the compressed air supply path 11 is connected to the compressed air supply 4 through a compressed air supply tube 15, a branch connection 16, a first bypass tube 17 and a flow control valve 18. The top of the pesticide solution supply path 12 is connected to the discharge hole (not shown in the drawing) of the spray nozzle 2 through a solution delivery tube 19. Also, the compressed air supply 4 is connected to a slit (not shown in the drawing) in the spray nozzle 2 through the compressed air supply tube 15, the branch connection 16 and a second bypass tube 20.

Figure 2:
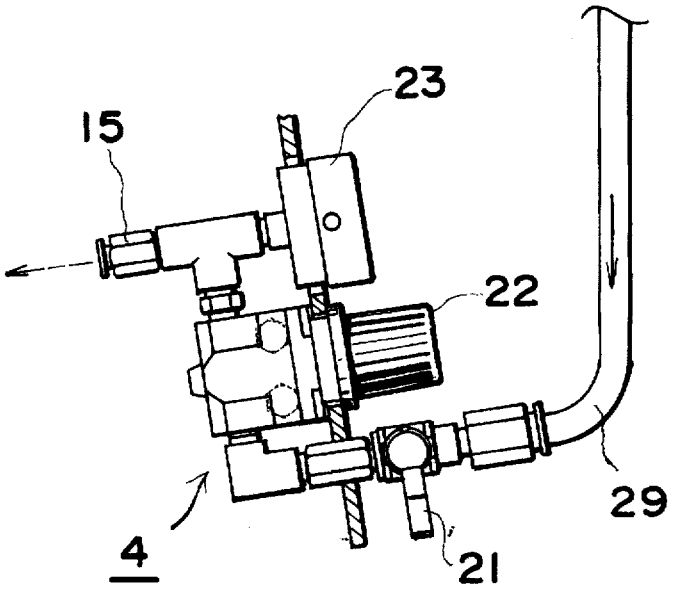
FIG. 2 is a top view of a compressed air supply part of the equipment shown in FIG. 1.

FIG. 2 is a top view showing one embodiment of a compressed air supply and its attachments. In FIG. 2, the numeral 21 denotes a compressed air supply cock, 22 a pressure regulator, and 23 a pressure gauge.

Figure 3:
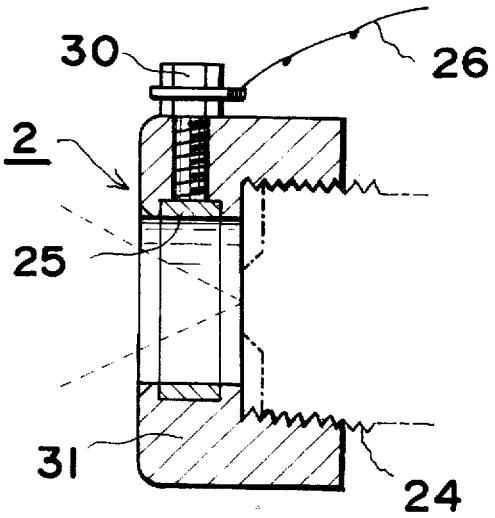
FIG. 3 is a vertical section showing an embodiment of spray nozzle.

FIG. 3 shows an embodiment of apparatus for applying an electrostatic charge to the particles of the spray solution as sprayed from the spray nozzle 2. This apparatus comprises a cap 31 formed of an antistatic material and, in which is embedded a brass ring 25. The cap 31 is screwed onto the tip of the main body 24 of the spray nozzle 2 so that the distance between it and the main body 24 is adjustable. The brass ring 25 is connected to a lead wire 26 through a screw 30 so that the predetermined voltage in the range 300 to 800 V may be applied from the direct voltage source 34 (FIG. 1). As seen in FIG. 1, a hand carrying grip 27, a stopper 28 by which the cover 3 is fixed, and a stop cock 32 to interrupt the delivery of spray solution 5 are provided on the tank cover 3.

A compressed air tube 29, connected to a compressor (not shown in the drawing) provides compressed air to the compressed air supply 4. When the compressed air supply cock 21 is opened, compressed air at the predetermined pressure is supplied through the pressure regulator 22 to the branch connection 16 from the compressed air supply tube 15. Then most of the compressed air is supplied to the air discharge slit of the spray nozzle 2 through the second bypass tube 20.

As a result, air is discharged into the solution delivery tube 19, connected to the solution discharge hole of the spray nozzle 2, and the pesticide solution supply path 12 is enforced, resulting in giving a negative pressure in these parts. Consequently, the spray solution 5, in the solution tank 1, is sucked through the inlet 9 and reaches the spray nozzle 2 to be sprayed as particles together with a diffusion jet of compressed air. The particles are impressed with an appropriate electrostatic charge as they pass through said brass ring 25 and then dispersed into air.

At the same time, the remaining portion of the compressed air is delivered to the compressed air outlet 8 through the branch connection 16, the first bypass tube 17, the flow control valve 18 and the compressed air supply path 11 so as to be supplied into the pesticide solution 5. Compressed air thus supplied forms bubbles which causes the pesticide solution 5 to be mixed, preventing precipitation of pesticide. The bubbles are also retained in the space between the surface of the pesticide solution 5, forcing delivery of the pesticide solution 5 to the spray nozzle 2.

According to the present invention, the deposition efficiency of pesticide solution on growing plants is improved. The spray equipment can be used placing it at any selected position in the greenhouse; therefore, it does not need installation with automatic travel system of the spray nozzle or the equipment itself. Moreover, the equipment can be used at lower voltage. Therefore, the present invention provides the pesticide spray equipment safer in use and more economical.

What is claimed is:

1. Electrostatic spray apparatus, comprising a hermetically sealed tank defining a chamber having a round-shaped bottom for storage of a solution containing particulate matter, a source of compressed air, a nozzle extending outwardly of said tank through which the compressed air is converted into a spray, a cap located on the tip of aid nozzle through which said spray passes, said cap having located on its interior surface a ring shaped electrode connected to a source of electric current, means for entraining said solution in compressed air comprising a pair of concentrically arranged tubes open at each end extending vertically into said chamber and having its lower end in said solution, said inner tube defining a passage connected at its upper end to said nozzle, said inner and outer tubes defining therebetween an annular passage connected at its upper end to said source of compressed air, a manifold mounted on the lower end of said inner and outer tubes adjacent the round bottom, said manifold being provided with radially directed air outlets communicating with said annular passage through which a portion of the compressed air is discharged in the said solution, and having the inner tube passing through the manifold so that the movement of compressed air through said annular passage is forced through said solution for simultaneously pressurizing and mixing said solution prior to passage through said inner tube for expulsion through said nozzle and means for maintaining said source of electric current at a selected voltage between 300 and 800 V to obtain a uniformly high electrostatic charge on the particles within said spray as said spray is ejected from said nozzle so that said spray is long floating and highly adherent.

* * * * *